United States Patent [19]

Lorenz et al.

[11] Patent Number: 4,751,450
[45] Date of Patent: Jun. 14, 1988

[54] LOW COST, PROTECTIVE START FROM COAST CIRCUIT

[75] Inventors: Dennis K. Lorenz, Brookfield; Steven F. Chmiel, Milwaukee, both of Wis.

[73] Assignee: PT Components, Inc., Milwaukee, Wis.

[21] Appl. No.: 910,931

[22] Filed: Sep. 24, 1986

[51] Int. Cl.$^4$ ............................................. H02P 1/44
[52] U.S. Cl. ...................................... 318/786; 318/785
[58] Field of Search ................. 318/785, 786, 794, 795

[56] References Cited

U.S. PATENT DOCUMENTS

| | | | |
|---|---|---|---|
| 3,258,668 | 6/1966 | Milligan | 318/795 |
| 3,671,830 | 6/1972 | Kruper | 318/786 |
| 4,196,462 | 4/1980 | Pohl | 361/33 |
| 4,605,888 | 8/1986 | Kim | 318/786 |
| 4,622,506 | 11/1986 | Shemanske et al. | 318/786 |
| 4,658,195 | 4/1987 | Min | 318/786 |
| 4,670,697 | 6/1987 | Wrege et al. | 318/786 |

*Primary Examiner*—David Smith, Jr.
*Attorney, Agent, or Firm*—Andrus, Sceales, Starke & Sawall

[57] ABSTRACT

Low cost, low part content motor control circuitry is provided, including blanking interval circuitry (42, 25) for preventing immediate connection of the start capacitor (5) of a single phase AC induction motor to the AC source (4) upon energization of the motor, to protect the start capacitor (5) and the start switch (6) against an overcurrent condition if the motor is de-energized while in the running mode and then re-energized while still coasting above a given speed, and to particularly prevent burn-out of the start capacitor (5) and/or start switch (6) upon reapplication of electrical power after a momentary power outage. Differently sized capacitors (42, 24) provide an early cross-over of auxiliary winding voltage relative to main winding voltage at the input of a quad comparator chip (31-34) to disable a turn-on signal for the start switch (6). Differently sized capacitors (42, 25) at the input of the chip provide the blanking interval and continue to disable the turn-on signal until auxiliary winding voltage decreases below a threshold value corresponding to a threshold speed less than or equal to cut-out speed.

7 Claims, 2 Drawing Sheets

LOW COST, PROTECTIVE START FROM COAST CIRCUIT

BACKGROUND AND SUMMARY

The invention relates to start switch control circuitry for automatically connecting and disconnecting a start capacitor of a single phase AC induction motor to and from the AC power source in starting and running modes, respectively. The invention prevents the start capacitor from being energized when the motor is rotating or coasting above a given speed, as may occur upon a momentary power line loss.

The invention particularly relates to improvements in reduced cost and part content over commonly owned co-pending U.S. application Ser. No. 911,012, filed herewith, "Start From Coast Protective Circuit", Chmiel, hereby incorporated herein by reference. The invention is particularly useful as an optional addition to the simplified circuitry shown in commonly owned co-pending U.S. application Ser. No. 06/885,087, filed July 14, 1986, "Low Cost, Load And Speed Sensitive Motor Control Starting Circuit", Wrege et al, now U.S. Pat. No. 4,670,697, hereby incorporated herein by reference, which provides improvements in reduced cost and part content over commonly owned co-pending allowed U.S. application Ser. No. 680,489, filed Dec. 11, 1984, "Load And Speed Sensitive Motor Control Starting Circuit", Shemanske et al, now U.S. Pat. No. 4,662,506, hereby incorporated herein by reference. The invention is particularly desirable in motors above a given horsepower rating, e.g., two horsepower and above.

If the motor is de-energized while in the running mode, either by a power loss or by intentionally switching the power off, the motor will continue to rotate and coast, particularly if it is subject to a high inertial load. If the start capacitor were to be energized under these conditions, a large fault current might flow through the auxiliary winding, the start capacitor and the start switch circuitry, potentially damaging the start switch circuitry and the start capacitor. While the motor is coasting, motor rotation induces a voltage in the auxiliary winding. This induced voltage plus any applied voltage from the power line causes the potentially damaging current. Burn-out of the start capacitor and/or start switch is a particular problem experienced during momentary power line loss where electrical power is reapplied from the line to the start capacitor while the motor is still rotating above a given safe cut-out speed.

DETAILED DESCRIPTION

As known in the art, a single phase AC induction motor has a main winding for running the motor, and a start or auxiliary winding for starting the motor. The motor start circuit is energized when starting the motor from rest and then disconnected at a given motor speed. The fields in the main and auxiliary windings are phase shifted, for example by capacitance, inductance, resistance or the like, to establish a rotating magnetic field for starting and/or running torque.

Figure 1:
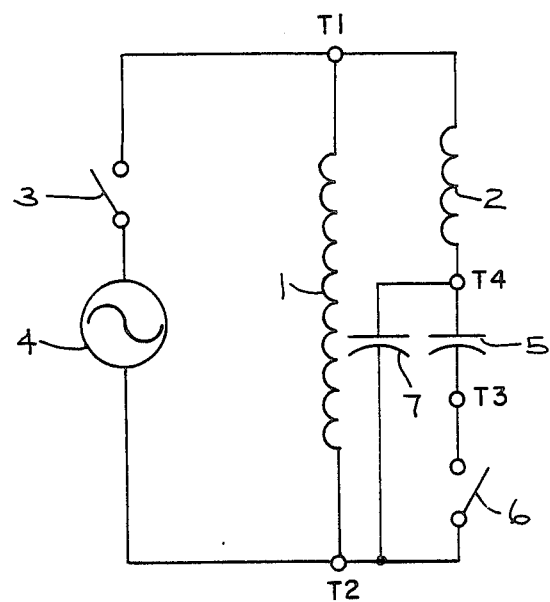
FIG. 1 schematically shows a typical environment in which the preferred embodiment of the invention is used.

FIG. 1 shows main winding 1 and auxiliary winding 2 connectable through a main switch 3 to an AC power source 4. Capacitors 5 and 7 provide the phase shift for starting torque. When the motor reaches a given threshold cut-out speed, switch 6 is opened to disconnect start capacitor 5 from AC power source 4. Capacitor 7 is a run capacitor and provides phase shift for running torque.

Figure 2:
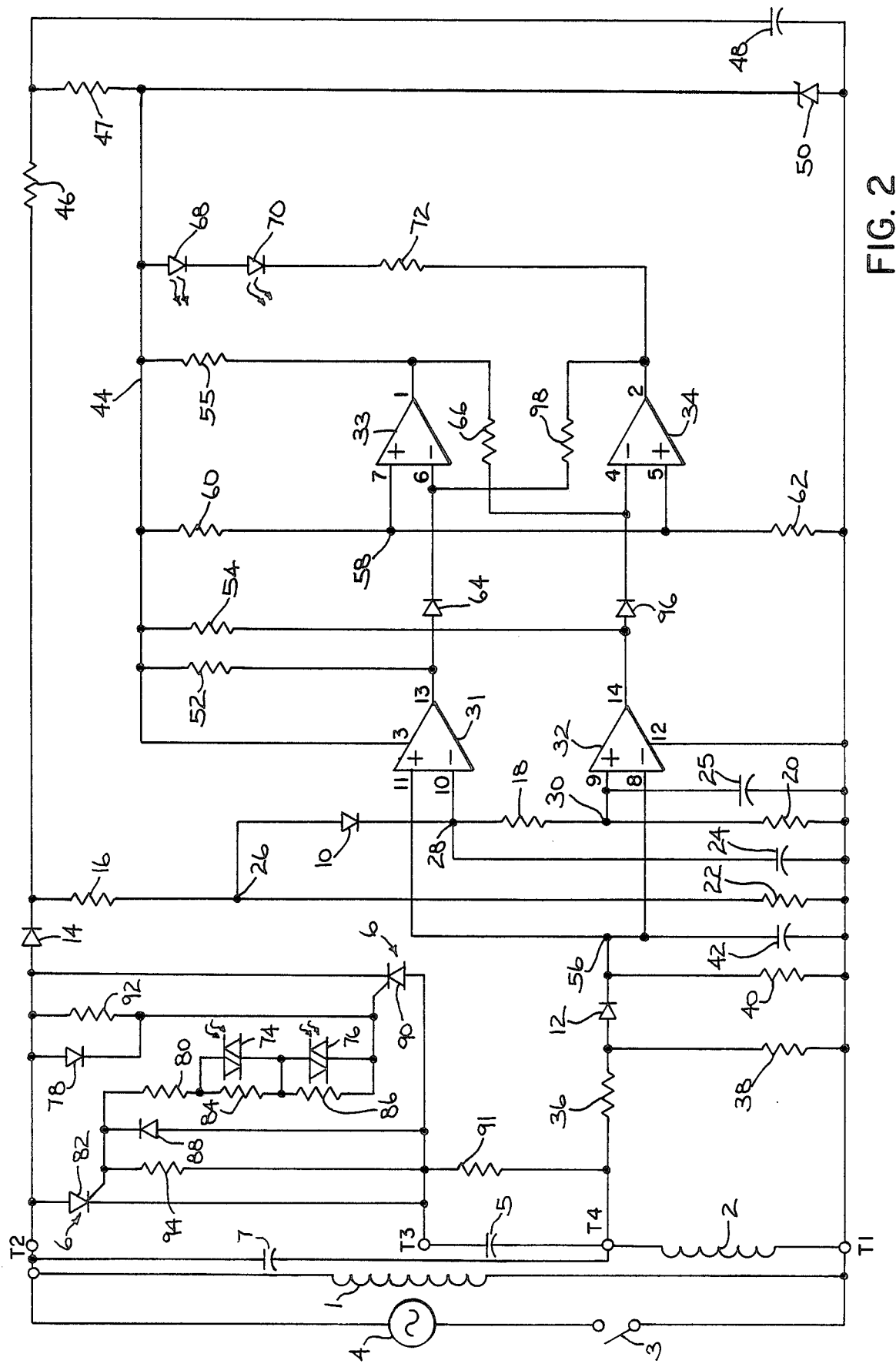
FIG. 2 is a circuit diagram of motor control circuitry in accordance with the invention.

FIG. 2 shows circuitry in accordance with the invention for controlling start switch 6. A main voltage detector circuit including diode 10 is connected across main winding 1 for sensing the magnitude of the main winding voltage. Main winding voltage is sensed through rectifying diodes 14 and 10 and resistors 16, 18, 20 and 22 and filtered by capacitors 24 and 25. The voltage at node 26 is reduced by the voltage divider provided by resistor 16 on one side of the node and the parallel combination of resistor 22 and series resistors 18 and 20 on the other side of the node. The voltage at node 28 is the voltage at node 26 less the drop across diode 10. The voltage at node 30 is the voltage at node 28 reduced by the voltage divider provided by resistors 18 and 20. The voltages at nodes 28 and 30 are derived from the AC line and provide reference voltages relative thereto for the cut-out voltage comparator 31 and for the cut-in or restart voltage comparator 32, which together with third and fourth voltage comparators 33 and 34 are provided by a quad comparator chip, such as an LM339, wherein manufacturer designated pin number assignments are shown for clarity. The cut-out and cut-in reference voltages vary with the line voltage and thus provide compensation of same, and allow the cut-out speed and the cut-in restart speed of the motor to be relatively independent of line voltage. The cut-in restart speed is less than the cut-out speed. The cut-in restart voltage at node 30 is less than the cut-out voltage at node 28.

An auxiliary voltage detector circuit including diode 12 is connected across auxiliary winding 2 for sensing the magnitude of the auxiliary winding voltage. The auxiliary winding voltage is sensed through rectifying diode 12 and resistors 36, 38 and 40 and filtered by capacitor 42, for comparison by comparator 31 against the floating main winding AC line reference voltage at node 28 and for comparison by comparator 32 against the floating main winding AC line reference voltage at node 30. A half wave rectified DC power supply is provided on line 44 from the AC source through diode 14, resistors 46, 47, filtering capacitor 48 and clamping zener diode 50. A fixed twelve volt DC supply is provided at line 44 for powering the control circuitry. Resistors 52, 54 and 55 are pull-up resistors for the outputs of the respective comparators.

As in the above noted Shemanske et al and Wrege et al applications, the circuitry in FIG. 2 utilizes the above noted quad comparator chip. As in the above noted Wege et al application, the flip flop 21 in FIG. 4 of the above noted Shemanske et al application is eliminated, and the flip flop function is provided by a hard wire connection between the comparators, to be described.

The minus input at pin 10 of comparator 31 is used as the reference input and is connected to node 28. The plus input at pin 11 of comparator 31 is the comparing input and is connected to node 56. When the magnitude of the auxiliary winding voltage at node 56 increases to or above a predetermined cut-out value relative to the magnitude of the main winding voltage at node 28 as a function of motor speed corresponding to a given cut-out speed, the output of comparator 31 at pin 13 provides a turn-off signal by going high. Third comparator 33 has a plus input at pin 7 which is used as the reference input and is connected to node 58 which receives a reduced voltage from line 44 divided down by the voltage divider provided by resistors 60 and 62. The minus input at pin 6 of comparator 33 is the comparing input and receives the turn-of high signal from comparator 31 through diode 64, which high signal at pin 6 causes the output of comparator 33 at pin 1 to go low. Comparator 33 compares the output of comparator 31 against the reference voltage from line 44 and outputs a low turn-off signal at pin 1 when the high turn-off signal at pin 13 rises in a given polarity direction to or above a predetermined value relative to the reference voltage at node 58 and pin 7. The low turn-off signal at pin 1 is supplied through resistor 66 to the fourth comparator 34 at pin 4 which is the minus input and is used as the comparing input for comparator 34. The plus input of comparator 34 at pin 5 is the reference input and is connected with pin 7 of comparator 33 at common node 58 and connected through the voltage divider network provided by resistors 60 and 62 to the regulated DC supply on line 44. When output pin 1 of comparator 33 goes low, the input pin 4 of comparator 34 likewise goes low, and in turn output pin 2 of comparator 34 goes high which provides a turn-off signal to switch 6, which in turn disconnects the start capacitor from AC source 4, to be described. Voltage comparator 34 compares at input pin 4 the output of comparator 33 against the reference voltage at pin 5 and outputs the high turn-off signal at pin 2 when the low turn-off signal from comparator 33 decreases in a given polarity direction to or below a predetermined value relative to the reference voltage at pin 5.

Switch 6 includes an optically isolated triac driver, as known in the art, for example an MOC3023, as in the above noted Shemanske et al and Wrege et al applications. Switch 6 includes SCR pair 82 and 90 connected in inverse parallel. When output pin 2 of comparator 34 goes low, current will flow through LEDs 68 and 70 through resistor 72. LEDs 68 and 70 are optically coupled to respective light responsive triacs 74 and 76 to drive the latter into conduction. When terminal T2 is positive with respect to terminal T3, current flows through diode 78, triacs 76 and 74, and resistor 80 to the gate of SCR 82 to bias the latter into conduction and conduct current from terminal T2 to terminal T3 and thus complete a circuit from AC source 4 through SCR 82 and start capacitor 5 and auxiliary winding 2. Protective resistors 84 and 86 are connected in parallel with respective triacs 74 and 76. When terminal T3 is positive with respect to terminal T2, current flows from terminal T3 through diode 88 and through resistor 80 and triacs 74 and 76 to the gate of SCR 90 to bias the latter into conduction and conduct current therethrough to complete a circuit from AC source 4 through auxiliary winding 2 and through start capacitor 5 and through SCR 90. Resistors 92 and 94 provide gate to cathode protection for respective SCRs 90 and 82. At the motor cut-out speed, output pin 2 of comparator 34 goes high, which prevents conduction through LEDs 68 and 70, which turns off light responsive triacs 74 and 76, which removes the gate drive for SCRs 82 and 90, such that the latter become nonconductive at the next respective zero crossing of the AC supply from source 4, hence disconnecting start capacitor 5 from AC source 4. Resistor 91 is connected between terminals T3 and T4 in parallel with start capacitor 5 and provides faster discharge of start capacitor 5 after cut-out, to reduce the voltage across switch 6 and extend the life of the latter.

Cut-in or restart comparator 32 detects a given decrease in the auxiliary winding voltage corresponding to a stall or overload condition of the motor, at which time comparator 32 generates a turn-on signal at its output pin 14 to turn on switch 6 and reconnect start capacitor 5 to AC source 4. The motor is automatically restarted, without manual intervention. If the motor gains speed, the magnitude of the voltage at node 56 again increases to the predetermined cut-out value relative to the voltage at node 28 as a function of motor speed corresponding to a designated cut-out speed, and switch 6 is turned off, again disconnecting start capacitor 5 from AC source 4 after reaching the cut-out speed.

When the voltage across auxiliary winding 2 at node 56 decreases to a predetermined cut-in value relative to the magnitude of the main winding voltage at node 30 as a function of motor speed corresponding to a given cut-in speed, the output of comparator 32 at pin 14 goes high and provides a turn-on signal. This turn-on signal is supplied through diode 96 to input pin 4 of comparator 34 causing the latter's output at pin 2 to go low which in turn enables conduction through LEDs 68 and 70, and hence activates triacs 74 and 76 and SCRs 82 and 90 to connect start capacitor 5 to AC source 4. The low state at output pin 2 of comparator 34 is also applied through resistor 98 to input pin 6 of comparator 33 to cause output pin 1 of the latter to go high, which high level is applied through resistor 66 to input pin 4 of comparator 34 to complete the flip flop or latching action and provide a latched condition.

Blanking interval circuitry disables the turn-on signal from comparator 34 during a blanking interval after energization of the motor to prevent immediate connection of start capacitor 5 to AC source 4 and protect against an overcurrent condition if the motor is de-energized while in the running mode and then re-energized while still coasting above a given threshold speed. At motor speeds below the cut-out speed, connection of start capacitor 5 and start switch 6 to AC source 4 will not damage such components. After the blanking interval, the comparator circuitry samples motor speed and actuates start switch 6 to reconnect start capacitor 5 to AC source 4 only if auxiliary winding voltage has dropped to or below a given threshold value relative to main winding voltage corresponding to the noted given threshold speed. In the preferred embodiment, the threshold speed is chosen to be the cut-in speed, though other threshold speeds may of course be used up to the cut-out speed.

The blanking interval circuitry includes capacitors 25 and 42. Capacitor 25 has a capacitance substantially larger than that of capacitor 42, preferably by a factor of about ten, such that the auxiliary winding voltage at node 56 rises relatively quickly, and the reference voltage at node 30 from the AC line rises more slowly due to the charging of the larger capacitor 25. Capacitor 24 has a capacitance substantially larger than that of capacitor 42, preferably by a factor of about ten, such that the auxiliary winding voltage at node 56 rises relatively quickly, and the reference voltage at node 28 from the AC line rises more slowly due to the charging of the larger capacitor 24. This provides a deliberate early cross-over of the auxiliary winding voltage, i.e., the auxiliary winding voltage at node 56 rises to or above the AC line reference voltage at node 28. Input pin 11 of comparator 31 is thus high relative to input pin 10, and output pin 13 is high which in turn causes the output pin 1 of comparator 33 to be low which causes output pin 2 of comparator 34 to be high which in turn prevents conduction through LEDs 68 and 70, thus keeping SCRs 82 and 90 off. In the preferred embodiment, the SCRs are off for about 50 milliseconds when starting from rest. At the end of this blanking interval, capacitor 42 discharges sufficiently such that the voltage at node 56 falls below the voltage at node 30, and output pin 14 goes high which causes output pin 2 of comparator 34 to go low which enables conduction through LEDs 68 and 70 and in turn trigger SCRs 82 and 90 into conduction to connect start capacitor 5 to AC source 4. If starting from rest, the auxiliary winding voltage is applied from AC source 4 through run capacitor 7.

If the motor is energized while it is coasting and if at the end of the blanking interval the auxiliary winding voltage at node 56 is higher than the voltage at node 28, the motor speed is above cut-out speed, and input pin 11 is higher than input pin 10, and output pin 13 of comparator 31 will be high which in turn causes output pin 1 of comparator 33 to be low which causes output pin 2 of comparator 34 to be high and hence blocks conduction through LEDs 68 and 70, whereby SCRs 82 and 90 are off. Reconnection of start capacitor 5 to AC source 4 is thus prevented unless motor speed decreases to below cut-in speed. At motor speeds above cut-in speed but below cut-out speed, the auxiliary winding voltage at node 56 will be higher than the voltage at node 30 and input pin 8 will be higher than input pin 9, and output pin 14 of comparator 32 will be low which in turn causes output pin 2 of comparator 34 to be high and hence blocks conduction through LEDs 68 and 70, whereby SCRs 82 and 90 are off. Reconnection of start capacitor 5 to AC source 4 is thus also prevented until motor speed decreases to below the cut-in speed, as controlled by restart cut-in comparator 32. As noted above, the given threshold speed for reconnection of start capacitor 5 after the blanking interval need not be as low as the cut-in speed, but should be less than or equal to the cut-out speed.

The blanking interval circuitry provides a time delay blanking interval after energization of the motor, whether at rest or coasting, and disables start switch 6 during the blanking interval such that start capacitor 5 is disconnected from AC source 4 during the blanking interval regardless of whether auxiliary winding voltage is above or below the threshold value. As noted above, after the blanking interval, the comparator circuitry actuates start switch 6 to reconnect start capacitor 5 to AC source 4 only if auxiliary winding voltage has dropped to or below the threshold value relative to main winding voltage, which threshold value corresponds to the noted threshold speed less than or equal to cut-out speed.

It is recognized that various equivalents, alternatives and modifications are possible within the scope of the appended claims.

We claim:

1. In a single phase AC induction motor having a main winding and an auxiliary winding both connectable to an AC power source, and having a start capacitor for providing a phase shifted field for starting torque, and having start switch means for automatically connecting and disconnecting said start capacitor to and from said AC source in starting and running modes, respectively, control circuitry for said start switch means comprising:

main voltage detector means for sensing main winding voltage;

auxiliary voltage detector means for sensing auxiliary winding voltage;

a first voltage comparator responsive to said main and auxiliary voltage detector means and comparing auxiliary winding voltage against main winding voltage and outputting a turn-off signal when auxiliary winding voltage increases to a given cut-out value relative to main winding voltage as a function of motor speed corresponding to a given cut-out speed;

a second voltage comparator responsive to said main and auxiliary voltage detector means and comparing auxiliary winding voltage against main winding voltage and outputting a turn-on signal when auxiliary winding voltage decreases to a given cut-in value relative to main winding voltage as a function of motor speed corresponding to a given cut-in speed, said given cut-in value being a stall or overload condition voltage derived from auxiliary winding voltage during running of said motor after starting, said given cut-in speed being less than said given cut-out speed;

a third voltage comparator responsive to the output of said first voltage comparator to output a turn-off signal in response to said turn-off signal from said first voltage comparator;

a fourth voltage comparator responsive to the output of said second voltage comparator and responsive to the output of said third voltage comparator, said fourth voltage comparator being responsive to said turn-off signal from said third voltage comparator to output a turn-off signal to said start switch means to disconnect said start capacitor from said AC source, said fourth voltage comparator being responsive to said turn-on signal from said second voltage comparator to output a turn-on signal to said start switch means to connect said start capacitor to said AC source;

blanking interval means disabling said turn-on signal from said fourth voltage comparator during a blanking interval immediately after energization of said motor to prevent immediate connection of said start capacitor to said AC source and protect against an overcurrent condition if said motor is de-energized while in said running mode and then re-energized while still coasting above a given speed.

2. The invention according to claim 1 wherein said last mentioned given speed is a threshold speed less than or equal to said cut-out speed, and wherein said blanking interval means provides a time delay blanking interval after energization of said motor, whether at rest or coasting, and disables said start switch means during said time delay blanking interval such that said start capacitor is disconnected from said AC source during said time delay blanking interval regardless of whether said auxiliary winding voltage is above or below a threshold value relative to main winding voltage and corresponding to said threshold speed, and such that after said time delay blanking interval said fourth comparator actuates said start switch means to connect said start capacitor to said AC source only if said auxiliary winding voltage has dropped to said threshold relative to said main winding voltage.

3. The invention according to claim 2 wherein said threshold speed is equal to said cut-in speed and wherein said threshold value is equal to said cut-in value, and comprising power supply means connected across said main winding and providing a reference voltage upon energization of said motor by said AC source, and wherein said blanking interval means comprises:

first capacitor means connected to said auxiliary voltage detector means and to a first input of said first voltage comparator and to a first input of said second voltage comparator;

second capacitor means connected to said main voltage detector means and to a second input of said second voltage comparator;

third capacitor means connected to said main voltage detector means and to a second input of said first voltage comparator;

said third capacitor means having a larger capacitance than said first capacitor means such that auxiliary winding voltage at said first input of said first comparator rises faster relative to said main winding voltage at said second input of said first comparator, such that at energization of said motor there is a deliberate early cross-over of auxiliary winding voltage relative to main winding voltage, and auxiliary winding voltage at said first input of said first comparator is higher than a given value relative to main winding voltage at said second input of said first comparator such that said first comparator outputs a turn-off signal to said third comparator which outputs a turn-off signal to said fourth comparator;

said second capacitor means having a larger capacitance than said first capacitor means such that at the end of said blanking interval said first capacitor means discharges sufficiently such that auxiliary winding voltage at said first input of said second comparator falls below a given value relative to said main winding voltage at said second input of said second comparator if motor speed is less than said threshold speed equal to said cut-in speed, such that said second comparator outputs a turn-on signal to said fourth comparator;

and such that at the end of said blanking interval if auxiliary winding voltage stays above said threshold value corresponding to said threshold motor speed equal to said cut-in speed, said auxiliary winding voltage at said first input of said second comparator is greater than said given value relative to said main winding voltage at said second input of said second comparator and said second comparator outputs said turn-off signal to said fourth comparator.

4. The invention according to claim 3 wherein:
said third voltage comparator compress the output of said first voltage comparator against said reference voltage and outputs a turn-off signal responsive to said turn-off signal from said first voltage comparator increasing in a given polarity direction to a predetermined value relative to said reference voltage;

the output of said second voltage comparator and the output of said third voltage comparator are connected together at a common node;

said fourth voltage comparator compares the voltage at said common node against said reference voltage and outputs said turn-off signal to said start switch means when the voltage at said common node decreases in a given polarity direction to a predetermined turn-off value relative to said reference voltage, and wherein said fourth voltage comparator outputs said turn-on signal to said start switch means when the voltage at said common node increases in a given polarity direction to a predetermined turn-on value relative to said reference voltage;

the output of said fourth voltage comparator is applied to an input of said third voltage comparator which is responsive to said output of said first voltage comparator, such that said turn-on signal from said fourth voltage comparator is also applied to said third voltage comparator such that the latter outputs said turn-on signal therefrom which is applied to an input of said fourth voltage comparator which also receives said output of said second voltage comparator to ensure that said fourth voltage comparator continues to generate said turn-on signal from the output thereof, and such that said turn-off signal from said output of said fourth voltage comparator is also applied to said input of said third voltage comparator which receives said output of said first voltage comparator such that said third voltage comparator outputs said turn-off signal to said input of said fourth voltage comparator which also receives said output of said second voltage comparator and ensures that said fourth voltage comparator continues to generate said turn-off signal, to provide latching flip flop action.

5. The invention according to claim 4 wherein said second capacitor means has a capacitance about ten times larger than that of said first capacitor means.

6. The invention according to claim 5 wherein said third capacitor means has a capacitance about ten times larger than that of said first capacitor means.

7. The invention according to claim 4 wherein said motor comprises a run capacitor connected between said AC power source and said auxiliary winding, such that when starting said motor from rest said auxiliary winding voltage sensed by said auxiliary voltage detector means connected to said first capacitor means and said first input of said first voltage comparator and said first input of said second voltage comparator is applied from said AC source through said run capacitor.

* * * * *